UNITED STATES PATENT OFFICE.

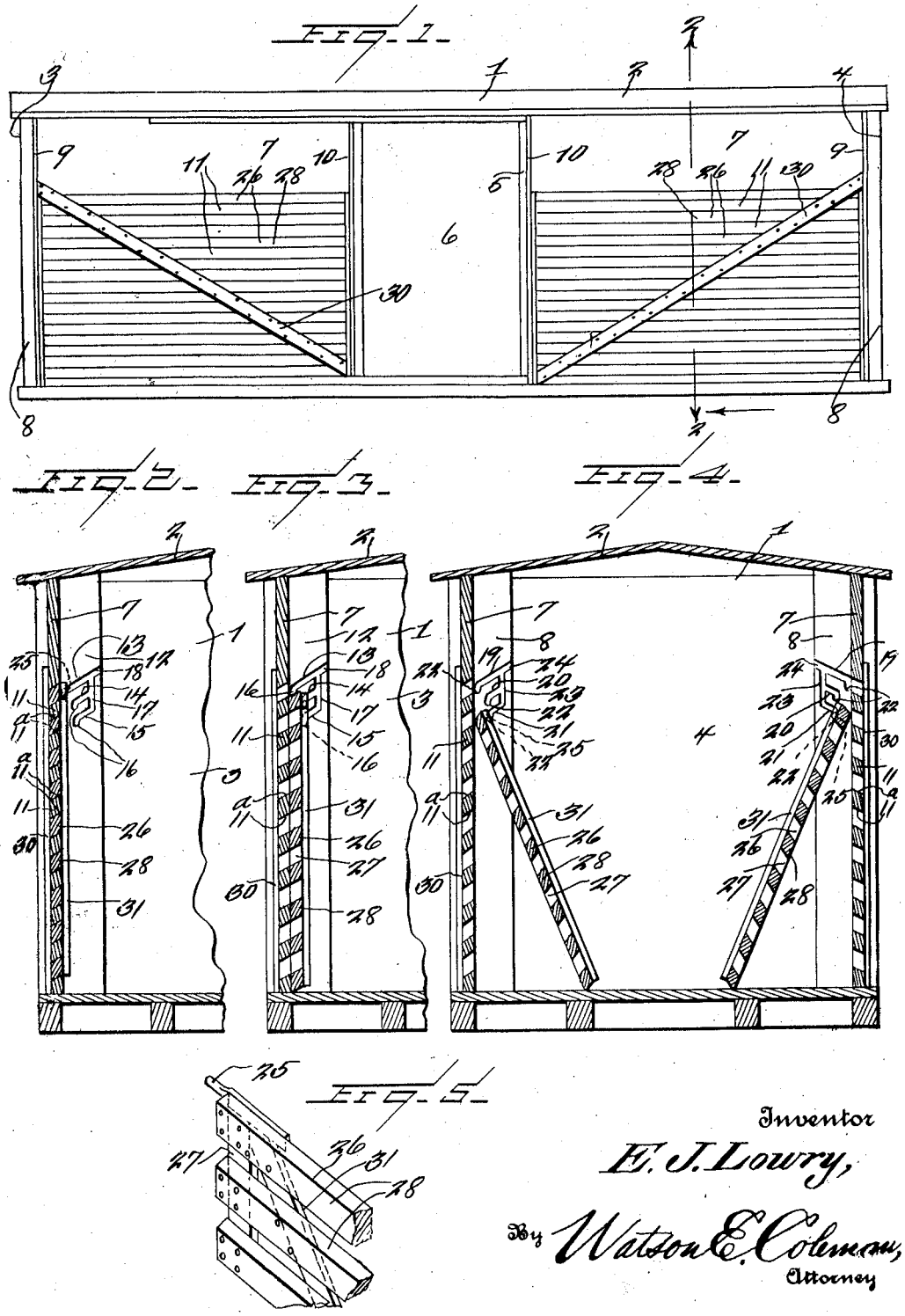

EMMET J. LOWRY, OF DUBUQUE, IOWA.

CONVERTIBLE CAR.

1,338,942.   Specification of Letters Patent.   Patented May 4, 1920.

Application filed December 27, 1919. Serial No. 347,659.

*To all whom it may concern:*

Be it known that I, EMMET J. LOWRY, a citizen of the United States, residing at Dubuque, in the county of Dubuque and State of Iowa, have invented certain new and useful Improvements in Convertible Cars, of which the following is a specification, reference being had to the accompanying drawings.

This invention relates to a combined box, stock, vegetable and fruit car and the invention in its broadest aspect aims to provide a car of this kind which is easily convertible from one to the other.

Another object of the invention is to provide a car including opposite slatted side portions, one on each side of each of the central doors in combination with side racks including spaced slats, equal to and adapted to engage the spaces between the slats of the side portions of the car, so as to convert the car into a box car, in combination with means carried by the frames of the doors to support the racks converging downwardly and inwardly of the car, to convert the car into a vegetable car, or to support the racks with their slats registering with or directly behind the slats of the car so as to convert the car into a stock car.

A still further object of the invention is to bevel the adjacent edges of the slats of the sides of the body of the car and the edges of the slats of the racks, so that when the slats of the racks engage between the slats of the car, the water will shed downwardly and from the interior of the car, thereby preventing the contents of the car from becoming damaged.

An additional object of the invention is to provide a car which, when converted into a vegetable car, is pilfer proof, since the racks are converged inwardly and downwardly toward each other, and the slats of the sides of the car and the racks are so spaced as to prevent the insertion of an arm sufficiently to reach beyond the slats of the racks. In fact, when constructing a car of this design for actual use it is the design of the invention to construct the openings between the slats of the car and those of the racks, substantially two inches wide, which will prevent the insertion of a hand and arm.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in side elevation of the improved car constructed in accordance with the invention, showing the racks in place whereby the car may be used as a box car, in other words, the racks are arranged, so that their slats engage the spaces between the slats of the car.

Fig. 2 is a transverse sectional view on line 2—2 of Fig. 1.

Fig. 3 is a transverse sectional view showing the racks adjusted so that their slats register with or are in parallelism with the racks of the sides of the car, thereby converting the car into a stock car.

Fig. 4 is a transverse sectional view looking toward the end of the car, showing the racks arranged so that the car may be used as a vegetable or fruit containing car, and Fig. 5 is an enlarged sectional view of one of the racks, more clearly showing the adjacent beveled edges of the slats.

Referring more especially to the drawings, 1 designates the car as a whole, and which comprises a roof 2 and the ends 3 and 4, which are entirely closed. The sides of the car are provided with door frames 5 including the usual doors 6, which are slidable in any conventional manner and extend downward from the roof of the car between the door frames and the ends of the sides of the car are closed or boarded up as shown at 7. The corners of the car are provided with uprights or posts 8, which, should the car be constructed of wood, will be incased in sheet metal. The vertical posts of the door frames should the car be constructed of wood, are also designed to be incased in sheet metal. These sheet metal casings are designated by the numerals 9 and 10 and are provided for the purpose of preserving and protecting the wood structure at these points.

The opposite sides of the car are provided with slats arranged longitudinally, and these slats 11 are spaced substantially two inches apart. The slats 11 are in series, one series on one side of each of the doors, thereby practically closing the entire car. However, the adjacent edges of the slats are beveled downwardly as shown at 11ª so as to shed the water from the interior of the car. These slats are arranged directly under the boarded portion 7.

The longitudinal faces 12 of the vertical beams of the door frames are provided with inclined slots 13, 14 and 15, the lower ends of which terminate in circular bearings 16. The slots are communicatively joined by the vertical slots 17. The inclined slots 13 have entrances 18. The corner posts or uprights 8 are provided with inclined slots 19, 20 and 21, which also terminate at their lower ends in circular bearings 22. The upper parts of the slots 19, 20 and 21 are joined communicatively by means of the vertical slots 23. The upper inclined slots 19 terminate in entrance openings 24. The slots 13, 14 and 15, and 19 20 and 21 are correspondingly inclined and are positioned directly opposite each other, so that they may receive the pintles 25 which extend from the end edges of the racks 26. The bearings 16 and 22 are positioned relatively to the slats of the sides of the car, so that when they are engaged by the pintles 25, the racks 26 may be supported either with their slats engaging the spaces between the slats of the sides of the car, or in registration with the slats of the sides of the car, or to support the racks in inwardly and downwardly converging positions, as shown in Figs. 2, 3 and 4.

The racks 26 include rectangular frames 27 and longitudinally extending parallel slats 28. These slats have their adjacent edges beveled downwardly and outwardly correspondingly to the inclinations of the edges of the slats 11, so that the slats 28 may engage between the slats 11, and also as to shed the water downwardly and outwardly from the interior of the car. When the slats 28 engage between the slats 11, the lower parts of the racks 26 are raised out of engagement with the bottom of the car.

When the slats 28 of the racks 26 are parallel and in registration with the slats 11, the lower portion of the racks 26 engage the bottom of the car. When the pintles 25 engage the bearings 22 of the lower inclined slots 15 and 21, the racks are converged inwardly and downwardly, and in this case the lower portions of the racks utilize portions of the floor space of the car near the opposite sides thereof, correspondingly to the spacing of the upper parts of the racks below the bearing 16 and 22 of the uppermost inclined slots.

When the pintles 25 of the racks 26 engage the bearings 16 and 22 of the inclined slots 13 and 19, and the slats 28 are engaging the spaces between the slats 11, the car is utilized as a box car for the purpose of shipping various non-perishable articles, such as cement, baled hay, lumber and the like. When the racks are so disposed so as to convert the structure into a box car, the sides of the car are entirely closed, and are water proof, since the beveled parts of the slats 11 and 28 act to shed the water. The converting of the structure from a box car into a live stock car, or to a vegetable car, simply involves the adjustment of the side racks, it being understood that the racks are at all times carried by the car on the interior thereof. When the structure is utilized as a stock car, the racks are adapted to rest upon and engage the bottom of the car, with their slats registering with the slats 11. The racks include braces 31 on their interior faces, and are preferably constructed of metal, though not necessarily, that is to say, should the racks and the car be constructed of wood. It is to be understood that the car may be constructed entirely of metal or of any other suitable material; and if constructed of metal, the corner post and the uprights and the door frames would not be incased. The doors of the casing are located centrally of the sides of the car as in the usual manner.

When the racks are converged inwardly and downwardly and their lower portions are positioned inwardly on the bottom of the car, so as to utilize parts of the floor space, the car may be utilized for receiving vegetables, fruit and the like. As previously stated, the slats 11 and 28 are spaced apart substantially two inches, thereby preventing the insertion of a hand between the slats, and thereby rendering the car pilfer proof. Owing to the racks 26 being constructed of slats, which are spaced apart, and owing to the provision of the spaced slats 11, a thorough circulation of air is permitted between the slats and up through the fruit, vegetables or other contents of the car.

When the racks are disposed with their slats interlocked between the slats 11, utilizing the structure as a box car, the car on its opposite sides will present an unbroken appearance. However, when the racks are disposed so that the structure may be used as a vegetable car, the car will appear as a stock car, since the racks are not as clearly shown as when they are used to convert the structure into a box car. The slats 11 are braced by the braces 30, which are arranged on the exterior of the slats 11.

What is claimed as new and useful is:—

1. In a convertible car, the combination with a car frame including upper closed sides and doors centrally of the sides of the car, the sides of the car below the upper closed parts thereof having longitudinally arranged spaced slats, of adjustable slatted racks arranged on the inner portion of the car, and means for supporting the racks adjacent the inner parts of the slats of the car, whereby the slats of the racks may interlock between the slats of the car, or may be disposed in registration and parallelism with the slats of the car, or whereby the racks may be converged inwardly and downwardly toward each other.

2. In a convertible car, the combination with a car frame including upper closed sides and doors centrally of the sides of the car, the sides of the car below the upper closed parts thereof having longitudinally arranged spaced slats, of adjustable slatted racks arranged on the inner portion of the car, and means for supporting the racks adjacent the inner parts of the slats of the car, whereby the slats of the racks may interlock between the slats of the car, or may be disposed in registration and parallelism with the slats of the car, or whereby the racks may be converged inwardly and downwardly toward each other, said supporting means comprising pintles on the ends of the racks, the vertical beams of the door frame and the corner post having oppositely arranged inclined slots, said slots having bearings to be engaged by the pintles to support the racks in any of the aforesaid positions.

3. The combination with a car body frame including doors arranged centrally of the sides of the body, said body having corner posts, the upper portions of the sides of the car between the door frames and the corner posts being closed, longitudinally arranged parallel spaced slats connecting the door frames with the corner posts, said corner posts and the uprights of the door frames having correspondingly inclined grooves provided with bearings at their lower ends, slatted racks having pintles to engage any two opposite bearings of certain of the inclined grooves to hold the slatted racks in different positions so that the car may be converted into a live stock, produce or box car.

4. The combination with a car body frame including doors arranged centrally of the sides of the body, said body having corner posts, the upper portions of the sides of the car between the door frames and the corner posts being closed, longitudinally arranged parallel spaced slats connecting the door frames with the corner posts, said corner posts and the uprights of the door frames having correspondingly inclined grooves provided with bearings at their lower ends, slatted racks having pintles to engage any two opposite bearings of certain of the inclined grooves to hold the slatted racks in different positions so that the car may be converted into a live stock, produce or box car, said corner posts and the uprights of the door frames having vertical grooves connecting the inclined grooves, whereby the pintles may engage any of the inclined grooves.

5. The combination with a car body frame including doors arranged centrally of the sides of the body, said body having corner posts, the upper portions of the sides of the car between the door frames and the corner posts being closed, longitudinally arranged parallel spaced slats connecting the door frames with the corner posts, said corner posts and the uprights of the door frames having correspondingly inclined grooves provided with bearings at their lower ends, slatted racks having pintles to engage any two opposite bearings of certain of the inclined grooves to hold the slatted racks in different positions so that the car may be converted into a live stock, produce or box car, the slats of the racks being adapted to interlock between the slats of the car, when the pintles engage the bearings of the uppermost inclined grooves, the slats of the car and the racks having adjacent engaging beveled edges to shed the water downwardly and from the interior of the car.

In testimony whereof I hereunto affix my signature.

EMMET J. LOWRY.